United States Patent [19]

Fukawa et al.

[11] Patent Number: 4,804,735

[45] Date of Patent: Feb. 14, 1989

[54] CRYSTALLINE AROMATIC POLYKETONE COPOLYMER PRODUCED FROM 4-MERCAPTOPHENOL, DIHALOTEREPHTALOPHENONE, AND HYDROQUINONE OR DIHYDROXYBENZOPHENONE

[75] Inventors: Isaburo Fukawa; Haruyuki Yoneda, both of Fuji, Japan

[73] Assignee: Asahi Kasei Kogyo Kabushiki Kaisha, Osaka, Japan

[21] Appl. No.: 24,031

[22] Filed: Mar. 10, 1987

[30] Foreign Application Priority Data

Mar. 10, 1986 [JP] Japan ................................. 61-50305
Sep. 22, 1986 [JP] Japan ................................. 61-224024

[51] Int. Cl.$^4$ ..................... C08G 75/04; C08G 75/23
[52] U.S. Cl. ..................................... 528/125; 528/128
[58] Field of Search ......................................... 528/125

[56] References Cited

U.S. PATENT DOCUMENTS 3,809,682  5/1974  Studinka .......................... 528/125

FOREIGN PATENT DOCUMENTS 0185317  6/1986  European Pat. Off. ............ 528/125
0193187  9/1986  European Pat. Off. ............ 528/125
2117820  12/1972  Fed. Rep. of Germany ...... 528/125

*Primary Examiner*—Harold D. Anderson
*Assistant Examiner*—Frederick Krass
*Attorney, Agent, or Firm*—Birch, Stewart, Kolasch & Birch

[57] ABSTRACT

A copolymer which can be employed for various molded articles, particularly for uses which require a high nonflammability, which copolymer is a crystalline aromatic polyketone type copolymer which has an intrinsic viscosity of not less than 0.40 and has a linear polymer structure comprising structural units (A) represented by the formula (A)

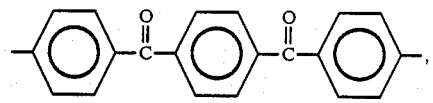

structural units (B) represented by the formula (B)

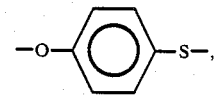

and structural units (C) represented by the formula (C$_1$)

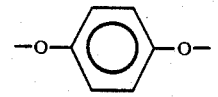

or by the formula (C$_2$)

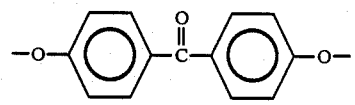

the molar ratio of said units (B) to said units (C) being in the range from 30:70 to 99:1, and the unit (A) and either the unit (B) or the unit (C) being linked alternately; and a process producing the same.

5 Claims, 3 Drawing Sheets

CRYSTALLINE AROMATIC POLYKETONE COPOLYMER PRODUCED FROM 4-MERCAPTOPHENOL, DIHALOTEREPHTALOPHENONE, AND HYDROQUINONE OR DIHYDROXYBENZOPHENONE

FIELD OF THE INVENTION AND RELATED ART STATEMENT

1. Field of the Invention

The present invention relates to a novel crystalline aromatic etherthioether-aromatic ketone type copolymer and a process for producing the same. More particularly, the present invention relates to a novel crystalline polymer excellent in heat resistance, nonflammability, solvent resistance and mechanical properties which has a chemical structure comprising phenylene groups linked through an ether group, a thioether group, and a ketone group, and also relates to an industrially useful process for producing the same.

2. Related Art Statement

Polymers heretofore known which have a structure comprising a phenylene group linked through an ether group and a ketone group include those which have the structural formula (I)

or the structural formula (II)

These polymers have attracted attention as molding materials owing to having excellent heat resistance, molding stability, and mechanical strength properties.

These polymers have a certain amount of nonflammability property due to the aromatic rings comprised therein. However, these polymers are not fully satisfactory in fields in which the polymers have been used which require a high degree of nonflammability. Accordingly, an attempt has been made to enhance the nonflammability of these macromolecular compounds (i.e., polymer) by the addition of flame retardants thereto [Japanese patent application Kokai (Laid-Open) No. 51,743/85].

Further known are polymers having a structure comprising phenylene groups linked through a thioether group. An example of these polymers is a polyphenylene sulfide having the structural formula (III)

The polphenylene sulfide is obtained, for example, by reacting dichlorobenzene with sodium sulfide [Japanese patent application Kokoku (Post-Exam. Appln.) No. 12,240/77].

This polyphenylene sulfide has the advantage of excellent nonflammability. Further, this polyphenylene sulfide has excellent characteristics including low moisture absorption, high dimensional stability, and good compatibility with inorganic fillers, which allows for the incorporation of a high concentration of said fillers.

However, since said polyphenylene sulfide is characterized with a low glass transition temperature (hereinafter referred to as TG) of 80° C., it will possess a low heat distortion temperature (hereinafter referred to as HDT) and hence will have a weakness in heat resistance and further, it has a relatively low crystal melting point (hereinafter referred to as Tm) of 281° C. Therefore, its usefulness as a heat resistance polymer is inevitably subject to limitations. Nevertheless, in view of having the other above mentioned excellent properties, the development of this type of polymer having a higher crystal melting point has been eagerly awaited.

Various attempts have been made to obtain a product of this type having a higher melting point. For example, it has been proposed to introduce a unit randomly into a polymer chain comprising linkages (U.S. Pat. No. 4,286,018). However, the polymers thus obtained have a disadvantage in that they possess lower crystallinity and lower heat resistance and mechanical properties than those of the homopolymer when the content of the unit therein decreases to 90% or less.

Further, there are also known macromolecular compounds, which are formed by introducing ketone groups regularly into polyphenylene sulfide, having the structural formula (IV)

or the structural formula (V)

However, the macromolecular compound represented by the formula (IV) mentioned above melts at 220° to 230° C. (U.S. Pat. No. 3,432,468) and hence is unsatisfactory in heat resistance. On the other hand, the macromolecular compounds represented by the above formula (V), although having a high Tm of 352° C., has the disadvantage of the films obtained therefrom, being brittle. (B.P. No. 1,368,967).

Thus, heretofore, a polymer of the polyphenylene sulfide type which has an improved heat resistance with increased Tg and Tm while retaining the excellent characteristics of polyphenylene sulfide, has not been discovered.

In order to obviate the disadvantages described above, the present inventors have previously proposed a linear polymer comprising structural units represented by the formula (Ia)

and/or the formula (Ib)

and structural units represented by the formula (IIa)

linked alternately (EPC No. 185,317).

The above-mentioned polymer processes an excellent heat resistance while retaining the excellent characteristics of polyphenylene sulfide including for example, high nonflammability, low moisture absorption, good molding stability, and good compatibility with inorganic fillers.

The polymer comprising structural units of formula (Ia) and/or (Ib) and those of formula (IIa) linked alternately is excellent in nonflammability and heat resistance (as judged by the measure of thermal weight loss temperature). Although it is suitable for film production, it still has a low crystallization rate even though its maximum degree of crystallization is high. Thus, in procedures such as injection moldings, it is required to increase the temperature of the mold, to increase the cooling time in the mold, or to anneal the molded article in order to increase the degree of crystallization. In view there of, the polymer cannot be regarded as being suitable for injection molding.

On the other hand, as to the method of preparing a polymer containing thioether groups, there is known a process of producing poly(etherthioether) from an alkali metal salt of hydroxythiophenol and an aromatic dihalide such as dichlorodiphenyl sulfone (B.P. No. 1,295,584). However, since the polymer obtained by this method contains sulfone groups and has an internal structure of an irregular arrangement of repeating units, the polymer has an amorphous structure and is not fully satisfactory with respect to its heat resistance, solvent resistance and mechanical properties.

Further, a method has been proposed which produces polyether or polythioether from a compound having two —XH groups (wherein X is an oxygen or sulfur atom) and a dihalobenzenoid compound in the presence of potassium carbonate (B.P. No. 1,264,900). However, this method uses a low polymerization temperature and, as in the above-mentioned case, a crystalline polymer cannot be obtained.

Thus, there has hitherto been no known material discovered to which has been imparted a sufficiently improved nonflammability while still retaining excellent heat resistance, molding stability and mechanical strength which are inherent to aromatic polyetherketones. In other words no material has been discovered which has had its heat resistance enhanced to the same level as that is prior polyetherketone while still having its excellent nonflammability, low moisture absorption, and excellent dimensional stability which are inherent to polyphenylene sulfide, retained.

OBJECT AND SUMMARY OF THE INVENTION

The object of this invention is to provide a novel crystalline copolymer which can be produced by simple means and yet has an excellent nonflammability imparted thereto while retaining excellent heat resistance, molding stability and mechanical strength which are inherent to an aromatic polyether ketone.

After extensive studies the present inventors have found that the above-mentioned object can be attained by using, as the raw materials, 4,4'-dihaloterephthalophenone, 4-hydroxythiphenol, and hydroquinone or 4,4'-dihydroxybenzophenone, and polymerizing these materials in a specified molar ratio. The present invention has been accomplished on the basis of the above finding.

Thus, according to this invention, there is provided a crystalline aromatic polyketone type copolymer which has an intrinsic viscosity of not less than 0.40 and has a linear polymer structure comprising structural units (A) represented by the formula (A)

(B) represented by the formula (B)

and structural units (C) represented by the formula (C₁)

or the formula (C₂)

the molar ratio of said units (B) to said units (C) being in the range from 30:70 to 99:1, and the unit (A) and either the unit (B) or the unit (C) being linked alternately.

The above-mentioned copolymer can, for example, be prepared by polycondensing an active-hydrogen containing component consisting of 30 to 99% by mole of 4-hydroxythiophenol and 70 to 1% by mole of hydroquinone, or an active-hydrogen containing component consisting of 30 to 99% by mole of 4-hydroxythiophenol and 70 to 1% by mole of 4,4'-dihydroxybenzophenone, with an amount of 4,4'-dihaloterephthalophenone substantially equimolar to the said active-hydrogen containing component, in at least one solvent selected from aromatic sulfones and aromatic ketones at a temperature in the range of 200° to 400° C. and in the presence of at least one member selected from alkali metal carbonates and bicarbonates.

DESCRIPTION OF THE PREFERRED EMBODIMENTS

The copolymer according to the present invention is a copolymer having a linear macromolecular structure which comprises structural units (A) represented by the formula (A)

structural units (B) represented by the formula (B)

and structural units (C) represented by the formula (C₁)

or the formula (C₂)

the unit (A) and either the unit (B) or the unit (C) being linked alternately.

More specifically, the present invention involves two types of copolymers, namely (1) a copolymer in which the unit (B) and the unit (C) represented by the formula (C₁) on one hand and the unit (A) on the other hand are linked alternately, and (2) a copolymer in which the unit (B) and the unit (C) represented by the formula (C₂) on one hand and the unit (A) on the other hand are linked alternately, in both of the copolymer (1) and (2) the molar ratio of the unit (B) to the unit (C) being in the range from 30:70 to 99:1.

In these copolymers, the state of distribution of the units (B) and (C), which link with the unit (A) alternately, involve a random, block, or alternate state. However, irrespective of the state of distribution, the copolymer shows an excellent nonflammability so long as its composition is within the range specified in the present invention.

The molar ratio of the unit (B) to the unit (C) is preferably in the range from 40:60 to 95:5, more preferably from 50:50 to 90:10.

The copolymer according to the present invention is crystalline over the whole range of composition and in all manners of linking.

In general, when monomers which respectively yield a crystalline polymer in homopolymerization are copolymerized with each other, the resulting copolymer generally becomes amorphous in a certain range of copolymer composition. However, the copolymer of the present invention was discovered to be crystalline over the whole range of composition, which was quite unexpected.

The copolymer of the present invention has an excellent nonflammability, one that is superior to that of previous aromatic polyetherketones. The copolymer of the present invention possesses properties equal or superior even to those of polyphenylene sulfide, which is known to be characterized with excellent nonflammability.

At an equal molar composition of the unit (B) and the unit (C), the above-mentioned copolymer (1) has an excellent nonflammability, one that is superior to the copolymer (2).

As will be shown later in Referential Examples, the copolymer of the present invention has a crystallization rate which is higher than that of a homopolymer, comprising the unit (A) and the unit (B) linked alternately, and is equal to or higher than that of a prior aromatic polyetherketone.

Further, the copolymer of the present invention has Tm and Tg values, both of which are higher than those of a homopolymer comprising the unit (A) and the unit (B) linked alternately, and superior in heat resistance than the homopolymer.

The polymer of the present invention should have an intrinsic viscosity of not less than 0.40, preferably 0.4 to 1.8. Polymers having an intrinsic viscosity of less than 0.4 are brittle and cannot be suitably used as molded articles. Polymers having an intrinsic viscosity of 1.8 or more possesses too high a viscosity when melted and are difficult to mold.

The X-ray diffraction analysis of the polymer of the present invention has revealed that this polymer could be classified into two groups based on the pattern of the X-ray diffraction chart.

The values of $2\theta$ in the diffraction charts for respective groups are shown below in the order of intensity down to the third.
Group 1: 23.0±0.3, 16.6±0.6, 18.5±0.3
Group 2: 18.7±0.2, 23.0±0.1, 20.7±0.3

The peak of 16.6±0.6 is characteristic of the group 1, and that of 20.7±0.3 is characteristics of the group 2.

The monomers of the raw materials used in the present invention are 4-hydroxythiophenol, 4,4'-dihydroxybenzophenone, hydroquinone, and 4,4'-dihaloterephthalophenone represented by the general formula (XI)

wherein $X^1$ and $X^2$ may be the same or different and each denotes a halogen atom.

The ratio of said 4-hydroxythiophenol to hydroquinone or 4,4'-dihydroxybenzophenone to be used is selected from the range of 30:70 to 99:1 by mole.

Specific examples of 4,4'-dihaloterephthalophenone include 4,4'-difluoroterephthalophenone, 4,4'-dichloroterephthalophenone, and 4-chloro-4'-fluoroterephthalophenone. These monomers may be used each alone or in a combination of two or more.

The ratio of 4,4'-dihaloterephthalophenone used to the total amount of 4-hydroxythiophenol and hydroquinone or to the total amount of 4-hydroxythiophenol and 4,4'-dihydroxybenzophenone should be substantially equimolar, and is selected from the range of 0.95 to 1.05 mole of the former relative to 1 mole of the latter. When the molar ratio is outside the above mentioned range, a high molecular weight polymer cannot be obtained.

In order that the polymer terminals may be in the form of stable aromatic halide units, it is particularly preferable to use 1.00 to 1.05 mole of 4,4'-dihaloterephthalophenone relative to 1 mole of the total of 4-hydroxythiophenol and hydroquinone or the total of 4-hydroxythiophenol and 4,4'-dihydroxybenzophenone.

In the process according to the present invention, aromatic ketones and aromatic sulfones are used as the polymerization solvent.

Aromatic ketones may be those represented by the general formula (VII)

wherein $R^1$ and $R^2$ may be the same or different from each other, and are a hydrogen atom, an alkyl group of 1 to 3 carbon atoms, or a phenyl group, provided that when $R^1$ and/or $R^2$ are (is) a phenyl group, they (it) may be fused with the benzene ring of the benzophenone skeleton.

Specific examples of such compounds include benzophenone, 4-methylbenzophenone, 4phenylbenzophenone, naphthyl phenyl ketone, and 4,4'-dimethylbenzophenone. Of these, benzophenone (m.p.: 48° to 49° C.) is particularly preferred because it is thermally stable, easily available, can be treated as liquid near room temperatures as contrasted to solid solvent such as diphenyl sulfone (m.p.: 128° to 129°), allowing easy separation of the product and recovery and purification of the solvent.

As another group of aromatic ketones, there may be mentioned the compound represented by the general formula (VIII)

wherein Y is an oxygen or sulfur atom; and $R^3$ and $R^4$ are the same as $R^1$ and $R^2$ defined above. Examples of such xanthone and thioxanthone compounds include xanthone, 2-methylxanthone, 2-phenylxanthone, thioxanthone, 2-methylthioxanthone, and 2-phenylthioxanthone. Particularly preferred of these are xanthone and thioxanthone.

As further examples of aromatic ketones, mention may be made of 4-phenoxybenzophenone, terephthalophenone, isophthalophenone, etc.

Aromatic sulfones may be those required by the general formulas (IX)

, and wherein $R^5$ and $R^6$ are the same as $R^1$ and $R^2$ defined above. Specific examples thereof include diphenyl sulfone, ditolyl sulfone, dibenzothiophenone, phenoxathin dioxide and 4-phenylsulfonylbiphenyl, diphenyl sulfone being more preferably of these.

Of these solvents, aromatic ketones are thermally more stable than aromatic polysulfones, and give a highly crystalline polymer of high molecular weight more readily. This is considered to be due to its more excellent solubility for polymer produced.

The amount of the solvent to be used is usually in the range of preferably 10 to 1,000 parts by weight, more preferably 20 to 500 parts by weight, relative to 100 parts by weight of the total of 4-hydroxythiophenol, hydroquinone or 4,4'-dihydroxybenzophenone, and 4,4'-dihaloterephthalophenone.

An amount of solvent larger than the above-mentioned range adversely affects the polycondensation efficiency. When the amount is smaller than the range, the effect of the solvent cannot be exhibited substantially.

Examples of alkali metal carbonates and alkali metal bicarbonates used in the process of this invention include sodium carbonate, potassium carbonate, rubidium carbonate, cesium carbonate, sodium hydrogen carbonate, potassium hydrogen carbonate, rubidium hydrogen carbonate, and cesium hydrogen carbonate. Particularly preferred are sodium carbonate, potassium carbonate, sodium hydrogen carbonate, and potassium hydrogen carbonate. These alkalis may be used each alone or in a combination of two or more.

The amount of alkali metals to be used is preferably 0.3 to 2 gram atoms relative to ½ mole of the total of 4-hydroxythiophenol and hydroquinone or the total of 4-hydroxythiophenol and 4,4'-dihydroxybenzophenone.

The alkali metal salt is preferably used in as small an amount as possible, because an excessive amount of the salt used would cause the reaction to become too vigorous, which would result in harmful side reactions taking place, and further, such is also disadvantageous from a cost point of view. However, when the amount of the alkali metal atom used is less than 0.3 gram atom, a longer polymerization time is necessary, which in turn would make it difficult to obtain the intended high molecular weight polymer.

When the solvent is an aromatic sulfone, xanthone compound, and thioxanthone compound, 0.5 to 1 gram atom is particularly preferable. When it is a benzophenone compound, 0.7 to 1.2 gram atoms is particularly preferable.

The alkali metal salt used is preferably anhydrous. In the case of a hydrous salt, it can be used by distilling water away from the polymerization system together with an azeotropic solvent.

The process for production according to the present invention is advantageously carried out as follows. A solvent, an alkali metal salt, 4,4'-dihaloterephthalophenone, 4-hydroxythiophenol and hydroquinone or 4,4'-dihydroxybenzophenone are placed in a reactor under an atmosphere of inert gas such as nitrogen or argon.

Polymerization is carried out by heating the resulting mixture under an atmosphere of inert gas such as nitrogen or argon at a temperature in the range of 200° to 400° C., preferably in the range of 250° C. to 350° C. At a temperature below 200° C., precipitation of the polymer formed takes place during polymerization and a low molecular weight polymer is obtained, whereas at a temperature exceeding 400° C., a marked discoloration of the polymer formed takes place owing to the degradation of the polymer.

Too rapid of a temperature elevation is unfavorable because it makes the polymerization system non-uniform, and accelerates side reactions which cause a discoloration and a gellation of the polymer. Accordingly, it is necessary that measures be taken to increase the temperature stepwise or gradually and to keep the temperature of the polymerization system as uniform as possible.

In order to obtain a high molecular weight polymer having an intrinsic viscosity of 0.40 or more, polymerization should be carried out at the final stage at a temperature not below 200° C., preferably not below 280° C. Also, prepolymerization may be carried out below said temperature to make the polycondensation proceed smoothly.

Water evolved during polymerization is preferably removed from the polymerization system. Methods used to remove water involve simply replacing the gas phase of the polymerization system with a dry inert gas, or carrying out the polymerization under a dry inert gas stream, or introducing a solvent having a lower boiling point than that of the polymerization solvent into the system to distill water away from the system together with the solvent.

Polymerization can be terminated by adding to the reaction system a suitable terminal stopping agent, for example a monofunctional or polyfunctional halide, more specifically methylene chloride, tert-butyl chloride, 4,4'-dichlorodiphenyl sulfone, 4,4'-difluorobenzophenone, 4,4'-difluoroterephthalophenone, 4-fluorobenzophenone etc., at the above-mentioned polymerization temperature. Also, this makes it possible to change a terminal group of the polymer into a thermally stable alkyl group, aromatic halogen group, and aromatic group.

The present invention will be further discribed in detail below with reference to Examples. However, it is in no way limited by these Examples.

Since the polymer of the present invention is soluble only in concentrated sulfuric acid and insoluble in organic solvents in general, its average molecular weight is difficult to determine. Accordingly, intrinsic viscosity is used as the measure of molecular weight.

The properties of the polymer were determined in the following manner.

(1) Intrinsic viscosity

By using a concentrated sulfuric acid of a density of 1.84 g/cm$^3$, a solution containing 0.1 g of polymer per 100 cm$^3$ of solution and a solution containing 0.5 g of polymer per 100 cm$^3$ of solution were prepared. The viscosity of the solution was measured at 25° C. Intrinsic viscosity was obtained by using the following equation:

Intrinsic viscosity $= \{(\eta_{rel}-1)/c\}_{c \to 0}$, wherein $\eta_{rel}$ denotes relative viscosity; c denotes concentration (expressed in b/100 ml); and the symbol $c \to 0$ means that the value of $(\eta_{rel}-1)/c$ is extraporated to a point at which concentration c is 0.

(2) Crystal melting point (Tm) and glass transition temperature (Tg)

These were determined by using a DSC (differential scanning colorimeter) at a temperature increasing rate of 10° C./min.

(3) Crystallinity

Crystallinity was determined from wide angle X-ray diffraction and the crystal melting point (Tm).

EXAMPLE 1

In a 4-necked separable flask equipped with a stirrer, a nitrogen inlet tube and a cooler, which had been replaced by nitrogen, were placed 13.14 g (0.0408 mole) of 4,4'-difluoroterephthalophenone, 2.77 g (0.022 mole) of 4-hydroxythiophenol, 1.98 g (0.018 mole) of hydroquinone, 5.52 g (0.040 mole) of anhydrous potassium carbonate, and 30 g of benzophenone. Heating of the mixture was initiated under a nitrogen gas stream while evolved water being removed from the reaction system.

The reaction mixture was brought to 305° C. over a period of one hour and 30 minutes, then kept at the temperature for 3 hours and, after addition of 4.0 g of 4,4'-difluorobenzophenone thereto, further kept at the temperature for 30 minutes.

The reaction mixture was then cooled, and the solid product obtained was pulverized. It was then washed twice with warm acetone, twice with warm water, and further once with warm acetone to obtain a polymer in 97% yield.

The polymer had an intrinsic viscosity of 0.80, Tm of 361° C., and Tg of 154° C.

The polymer was insoluble at room temperature in such solvents as methylene chloride, chloroform, N,N'-dimethylformamide, sulfolane, dimethyl sulfoxide, hexamethylphosphorictriamide, hexane and toluene.

Figure 1:
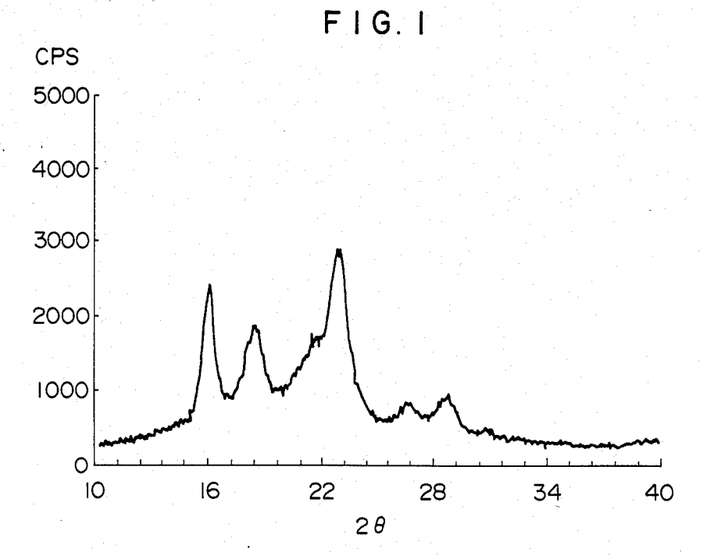
FIGS. 1, 2, 3 and 4 are each a graph showing the X-ray diffraction spectrum or the infrared absorption spectrum of a copolymer obtained according to the present invention.
Figure 3:
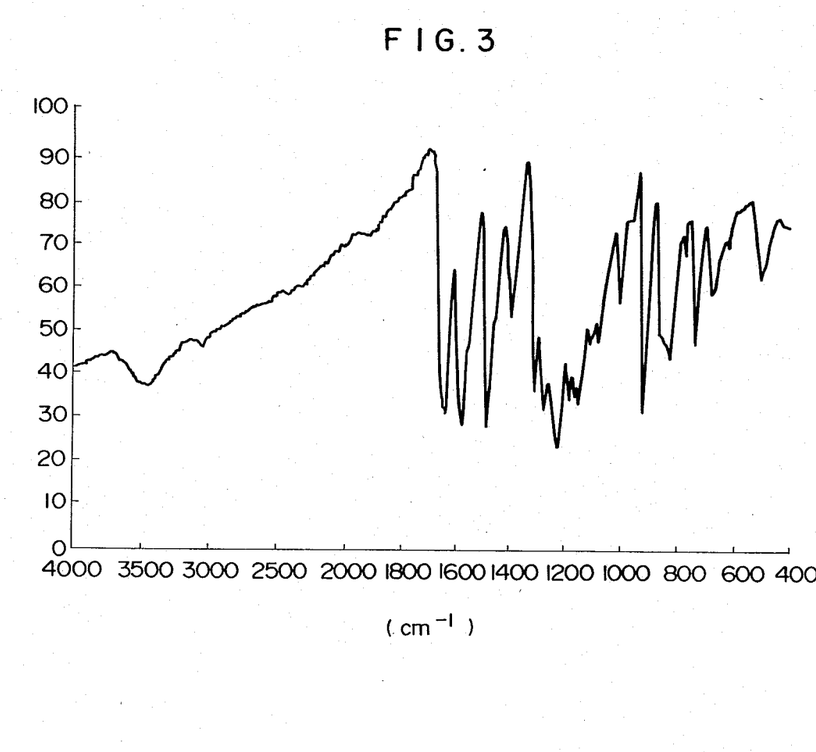

The X-ray diffraction chart and the IR analysis chart of the polymer are shown in FIGS. 1 and 3, respectively. The X-ray diffraction and the IR analysis were conducted by using the powder obtained by polymerization as it was. The result of the elemental analysis of the polymer was as follows.

|  | C | H | O | S |
|---|---|---|---|---|
| Found (%) | 77.8 | 4.0 | 13.7 | 4.3 |
| Calculated (%) | 77.82 | 4.02 | 13.76 | 4.40 |

The polymer was found to comprise aromatic ether-thioether units, consisting of 55% by mole units (B)

and 45% by mole units (C)

according to the formula (1), and units (A)

linked alternately.

The polymer was pressed at 400° C. for 6 minutes to obtain a film. The film was highly resistant to repeated bending and had a tensile strength of 920 kg/cm² and an elongation at break of 80% (as determined according to ASTM D-882).

EXAMPLE 2

Heating was initiated in the same manner as in Example 1 but by using 13.14 g (0.0408 mole) of 4, 4'-difluoroterephthalophenone, 3.53 g (0.028 mole) of 4-hydroxythiophenol, 1.32 g (0.012 mole) of hydroquinone 2.76 g (0.020 mole) of anhydrous potassium carbonate, 2.12 g (0.020 mole) of anhydrous sodium carbonate, and 30 g of benzophenone. The reaction mixture was kept at 305° C. for 5 hours, then 3.0 g of 4,4'-dichlorodiphenyl sulfone was added thereto, and the mixture was kept at the temperature for 30 minutes. It was then allowed to cool, and treated in the same manner as in Example 1 to obtain a solid.

The polymer thus obtained had an intrinsic viscosity of 1.12 and Tm of 359° C.

EXAMPLE 3

In the same manner as in Example 1, 14.63 g (0.0412 mole) of 4,4'-dichloroterephthalophenone, 4.54 g (0.036 mole) of 4-hydroxythiophenol, 0.44 g (0.004 mole) of hydroquinone, 4.42 g (0.032 mole) of anhydrous potassium carbonate, and 30 g of xanthone were placed in the reaction flask and heating was initiated. The mixture was kept at 300° C. for 4 hours, then 4 g of 4,4'-difluorobenzophenone was added thereto, and the resulting mixture was further kept at the temperature for 30 minutes. It was then allowed to cool and treated in the same manner as in Example 1 to obtain a solid.

The polymer thus obtained had an intrinsic viscosity of 0.76 and Tm of 356° C.

EXAMPLE 4

In the same manner as in Example 1, 13.14 g (0.0408 mole) of 4,4'-difluoroterephthalophenone, 4.03 g (0.032 mole) of 4-hydroxythiophenol, 0.88 g (0.008 mole) of hydroquinone, 5.52 g (0.040 mole) of anhydrous potassium carbonate, and 30 g of diphenyl sulfone were placed in the reaction flask and heating was initiated. The mixture was kept at 310° C. for 3 hours, and then methyl chloride was blown thereinto at the temperature for 30 minutes.

The reaction mixture was allowed to cool and treated in the same manner as in Example 1 to obtain a solid.

The polymer thus obtained had an intrinsic viscosity of 1.01 and Tm of 357° C.

EXAMPLE 5

In the same manner as in Example 1, 13.14 g (0.0408 mole) of 4,4'-difluoroterephthalophenone, 3.02 g (0.024 mole) of 4-hydroxythiophenol, 1.76 g (0.016 mole) of hydroquinone, 3.86 g (0.028 mole) of anhydrous potassium carbonate, and 30 g of thioxanthone were placed in the reaction flask and heating was initiated. The mixture was kept at 310° C. for 4 hours, then 3.0 g of 4,4'-difluoroterephthalophenone was added thereto, and the resulting mixture was allowed to react at the temperature for 30 minutes. It was then allowed to cool, and treated in the same manner as in Example 1 to obtain a solid.

The polymer thus obtained had an intrinsic viscosity of 0.92 and Tm of 360° C.

EXAMPLE 6

In the same manner as in Example 1, 13.01 g (0.0404 mole) of 4,4'-difluoroterephthalophenone, 2.67 g (0.0212 mole) of 4-hydroxythiophenol, 2.07 g (0.0188 mole) of hydroquinone, 5.63 g (0.0408 mole) of anhydrous potassium carbonate, and 30 g of benzophenone were placed in the reaction flask and heating was initiated. The mixture was kept at 305° C. for 2 hours and 30 minutes, then 3.0 g of 4,4'-difluorobenzophenone was added thereto, and the resulting mixture was kept at the temperature for 30 minutes.

It was then allowed to cool, and treated in the same manner as in Example 1 to obtain a solid.

The polymer thus obtained had an intrinsic viscosity of 0.89, Tm of 356° C., and Tg of 154° C.

The polymer showed a thermal weight loss temperature (expressed in terms of the temperature at which the weight loss reached 5% when the temperature of the polymer was increased at a rate of 10° C./min) of 555°

C., a markedly improved value as compared with the thermal weight loss temperature of 480° C. of a polyphenylene sulfide, Ryton V-1.

EXAMPLE 7

In a 4-necked separable flask equipped with a stirrer, a nitrogen inlet tube and a cooler, which had been replaced by nitrogen, were placed 9.76 g (0.0303 mole) of 4,4'-difluoroterephthalophenone, 2.65 g (0.021 mole) of 4-hydroxythiophenol, 1.93 g (0.009 mole) of 4,4'-dihydroxybenzophenone, 4.14 g (0.030 mole) of anhydrous potassium carbonate, and 30 g of diphenyl sulfone. Heating of the mixture was initiated under nitrogen atmosphere. The reaction mixture was brought to 305° C. over a period of 2 hours, kept at the temperature for 3 hours, then 6.0 g of 4,4'-difluorobenzophenone was added thereto, and the resulting mixture was kept at the temperature for further 30 minutes.

The reaction mixture was cooled, and the solid obtained was pulverized. It was then washed twice with warm acetone, once with warm water, once with an about 5% aqueous hydrochloric acid solution, twice with warm water, and further once with warm acetone, to obtain a polymer in 96% yield.

The polymer had an intrinsic viscosity of 0.89, Tm of 356° C., and Tg of 155° C.

The polymer was insoluble at room temperature in such solvents as methylene chloride, chloroform, N,N-dimethylformamide, sulfone, dimethyl sulfoxide, hexamethylphosphorictriamide, hexane, and toluene.

Figure 2:
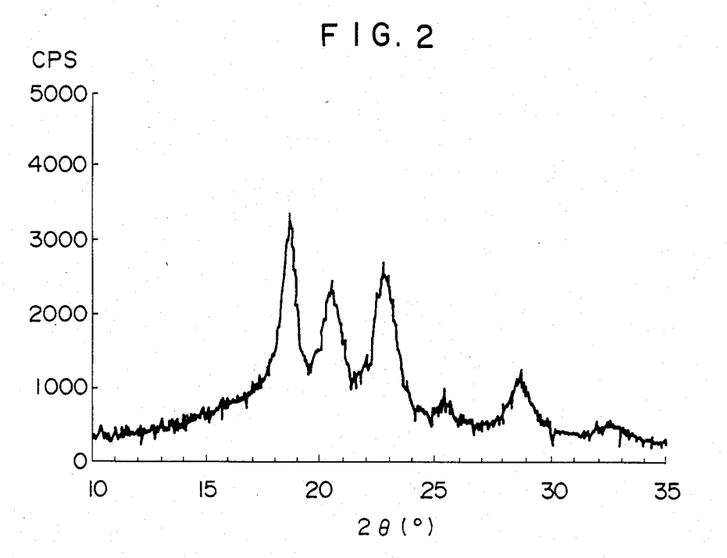
Figure 4:
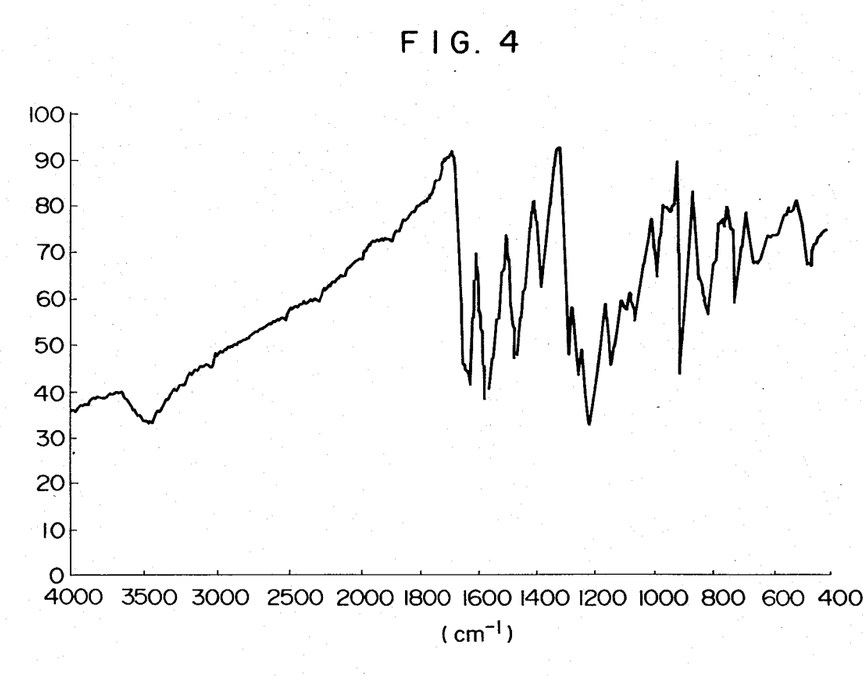

The X-ray diffraction chart and the IR analysis chart are shown in FIGS. 2 and 4, respectively. The X-ray diffraction and the IR analysis were conducted by using the powder obtained by polymerization as it was. The result of elemental analysis of the polymer was as follows.

|  | C | H | O | S |
|---|---|---|---|---|
| Found (%) | 77.5 | 3.9 | 13.1 | 5.2 |
| Calculated (%) | 77.61 | 3.99 | 13.24 | 5.16 |

The polymer was found to comprise aromatic ether-thioether units, consisting of 70% by mole of units (B)

and 30% by mole of units (C)

according to the formula (C$_2$), and units (A)

linked alternately.

The polymer was pressed at 400° C. for 6 minutes to obtain a film. The film was highly resistant to repeated bending. The film had a tensile strength of 930 kg/cm$^2$ and an elongation at break of 75% (as determined according to ASTM D-882).

EXAMPLE 8

Heating was initiated in the same manner as in Example 1 but by using 10.86 g (0.0306 mole) of 4,4'-dichloroterephthalophenone, 2.08 g (0.0165 mole) of 4-hydroxythiophenol, 2.89 g (0.0135 mole) of 4,4'-dihydroxybenzophenone, 4.14 g (0.030 mole) of anhydrous potassium carbonate, and 30 g of xanthone. The reaction mixture was kept at 325° C. for 5 hours, then 40 g of 4-fluorobenzophenone was added thereto, and the resulting mixture was kept at the temperature for 30 minutes. It was then allowed to cool, and treated in the same manner as in Example 1 to obtain a solid.

The polymer thus obtained had an intrinsic viscosity of 0.68, Tm of 360° C., and Tg of 156° C.

EXAMPLE 9

In the same manner as in Example 1, 9.76 g (0.0303 mole) of 4,4'-difluoroterephthalophenone, 3.40 g (0.027 mole) of 4-hydroxythiophenol, 0.64 g (0.003 mole) of 4,4'-dihydroxybenzophenone, 1.59 g (0.015 mole) of anhydrous sodium carbonate, 2.07 g (0.015 mole) of anhydrous potassium carbonate, and 30 g of benzophenone were placed in the reaction flask and heating of the mixture was initiated. The reaction mixture was kept at 305° C. for 3 hours and 30 minutes, then 4.0 g of 4,4'-dichlorodiphenyl sulfone was added thereto, and the resulting mixture was kept at the temperature for further 30 minutes. It was then allowed to cool and treated in the same manner as in Example 1 to obtain a solid.

The polymer thus obtained had an intrinsic viscosity of 0.92, Tm of 355° C., and Tg of 153° C.

EXAMPLE 10

In the same manner as in Example 1, 9.76 g (0.0301 mole) of 4,4'-difluoroterephthalophenone, 3.02 g (0.024 mole) of 4-hydroxythiophenol, 1.28 g (0.006 mole) of 4,4'-dihydroxybenzophenone, 0.95 (0.009 mole) of anhydrous sodium carbonate, 2.90 g (0.021 mole) of anhydrous potassium carbonate, and 30 g of benzophenone were placed in the reaction flask and heating of the mixture was initiated. The reaction mixture was kept at 305° C. for 4 hours and 30 minutes, then 6.0 g of 4,4'-difluoroterephthalophenone was added thereto, and the resulting mixture was further kept at the temperature for 30 minutes. Then, it was allowed to cool, and treated in the same manner as in Example 1 to obtain a solid. The polymer thus obtained had an intrinsic viscosity of 1.15, Tm of 356° C., and Tg of 154° C.

EXAMPLE 11

In the same manner as in Example 1, 10.86 g (0.0306 mole) of 4,4'-dichloroterephthalophenone, 2.27 g (0.018 mole) of 4-hydroxythiophenol, 2.57 g (0.012 mole) of 4,4'-dihydroxybenzophenone, 4.14 g (0.030 mole) of anhydrous potassium carbonate, and 30 g of diphenyl sulfone were placed in the reaction flask and heating of the mixture was initiated. The reaction mixture was kept at 320° C. for 4.5 hours, then 6.0 g of 4,4'- difluoroterephthalophenone was added thereto, and the resulting mixture was allowed to react at the temperature for 30 minutes.

The reaction mixture was then allowed to cool, and treated in the same manner as in Example 1 to obtain a solid. The polymer thus obtained had an intrinsic viscosity of 0.72, Tm of 357° C., and Tg of 155° C.

EXAMPLE 12

A 1-liter autoclave was used as the reactor. After the interior of the reaction system was replaced with nitrogen, 95.57 g (0.303 mole) of 4,4'-difluoroterephthalophenone, 20.79 g (0.165 mole) of 4-hydroxythiophenol, 14.85 g (0.135 mole) of hydroquinone, 42.23 g (0.306 mole) of anhydrous potassium carbonate, and 300 g of benzophenone were placed in the autoclave, and the temperature of the resulting mixture was increased while evolved water being removed from the system under a nitrogen gas stream.

After brought to 300° C., the reaction mixture was kept at the temperature for 1 hour and 30 minutes, then the nitrogen gas stream was stopped, the autoclave was tightly closed, and the mixture was brought to 330° C. and kept at the temperature for 3 hours. Then, 80 g of 4,4'-difluoroterephthalophenone was added to the above mixture, and the resulting mixture was kept at the temperature for 20 minutes and then allowed to cool.

The solid thus obtained was washed in the same manner as in Example 1 to obtain 116.4 g of a copolymer.

The copolymer had an intrinsic viscosity of 0.96.

Test pieces of 3.2 mm thickness were prepared by injection molding from the copolymer. The test pieces showed a tensile strength of 1,250 kg/cm$^2$, elongation at break of 80%, flexural modulus of 43,500 kg/cm$^2$, Izod impact strength of 3.2 kg·cm/cm, and heat distortion temperature (at 18.6 kg/mm$^2$) of 169° C., as determined according to ASTM D-638, D-790, D-256, and D-648, respectively.

EXAMPLE 13

A copolymer was obtained in the same manner as in Example 1 but by using 13.14 g (0.0408 mole) of 4,4'-difluoroterephthalophenone, 2.02 g (0.016 mole) of 4-hydroxythiophenol, 2.64 g (0.024 mole) of hydroquinone, 5.52 g (0.040 mole) of anhydrous potassium carbonate, and 30 g of benzophenone.

The copolymer had an intrinsic viscosity of 0.89 and Tm of 362° C.

EXAMPLE 14

A copolymer obtained in the same manner as in Example 1 but by using 9.76 g (0.0303 mole) of 4,4'-difluoroterephthalophenone, 1.13 g (0.009 mole) of 4-hydroxythiophenol, 4.49 g (0.021 mole) of 4,4'-dihydroxybenzophenone, 4.14 g (0.030 mole) of anhydrous potassium carbonate, and 30 g of diphenyl sulfone.

The copolymer had an intrinsic viscosity of 0.81, Tm of 367° C., and Tg of 157° C.

COMPARATIVE EXAMPLE 1

A solid polymer was obtained in the same manner as in Example 1 but by using 13.14 g (0.0408 mole) of 4,4'-difluoroterephthalophenone, 5.04 g (0.0400 mole) of 4-hydroxythiophenol, 5.63 g (0.0408 mole) of anhydrous potassium carbonate, and 30 g of benzophenone. The polymer had an intrinsic viscosity of 1.08, Tm of 355° C., and Tg of 152° C.

COMPARATIVE EXAMPLE 2

A solid polymer was obtained in the same manner as in Example 12 but by using 97.57 g (0.303 mole) of 4,4'-difluoroterephthalophenone, 7.56 g (0.060 mole) of 4-hydroxythiophenol, 26.40 g (0.240 mole) of hydroquinone, 42.23 g (0.306 mole) of anhydrous potassium carbonate, and 300 g of benzophenone in a 1 l autoclave. The polymer had an intrinsic viscosity of 0.87.

COMPARATIVE EXAMPLE 3

A solid polymer was obtained in the same manner as in Example 12 but by using 97.57 g (0.303 mole) of 4,4'-difluoroterephthalophenone, 7.56 g (0.060 mole) of 4-hydroxythiophenol, 51.36 g (0.240 mole) of 4,4'-dihydroxybenzophenone, 42.23 g (0.306 mole) of anhydrous potassium carbonate, and 300 g of benzophenone in a 1 l autoclave. The polymer had an intrinsic viscosity of 0.92.

REFERENTIAL EXAMPLE 1

(1) Preparation of copolymer for nonflammability test

Sample A: A copolymer was obtained in the same manner as in Example 1 except that a 1-liter autoclave was used and the reagents were used in 10 times the amount. It had an intrinsic viscosity of 0.89, Tm of 361° C. and Tg of 154° C.

Sample B: A copolymer was obtained in the same manner as in Example 2 except that a 1-liter autoclave was used and the reagents were used in 10 times the amount. It had an intrinsic viscosity of 1.01, Tm of 358° C., and Tg of 153° C.

Sample C: A copolymer was obtained in the same manner as in Example 7 except that a 1-liter autoclave was used and the reagents were used in 10 times the amount. It had an intrinsic viscosity of 0.98, Tm of 356° C., and Tg of 155° C.

Sample D: A copolymer was obtained in the same manner as in Example 13 except that a 1-liter autoclave was used and the reagents were used in 10 times the amount. It had an intrinsic viscosity of 0.83, Tm of 362° C., and Tg of 155° C.

(2) Polymers used for nonflammability test

The copolymers obtained in Examples 1, 2, 3, 7, 8, 9, 13 and 14, the copolymers of Samples A, B, C and D, and, for compression, and aromatic polyetherketone PEEK (mfd. by I.C.I. Ltd., brand name: Victrex 45 P), polyphenylene sulfides (Ryton P-4 and Ryton R-4, mfd. by Phillips Corp.), and the copolymers obtained in Comparative Examples 2 and 3 were used to determined the oxygen index.

The determination was made according to JIS-K7201. Film No. B-1 or test piece No. A-1 was prepared for the determination.

Film No. B-1 was prepared by pressing and test piece No. A-1 was prepared by means of a small injection machine.

(3) Test of nonflammability

The determination was made by using a candle-type combustion tester, Type D (mfd. by Toyo Seiki Co.). The results of determination are shown below.

| Results of test with test piece No. A-1 | |
|---|---|
| Sample | Oxygen index (%) |
| Sample A | 47.1 |
| Sample B | 48.4 |
| Sample C | 46.9 |
| Sample D | 41.2 |
| PEEK 45P | 35.0 |
| Polyphenylene sulfide R-4 | 46.0 |
| Comparative Example 2 | 36.0 |

-continued

| Sample | Oxygen index (%) | Thickness (μm) |
|---|---|---|
| Comparative Example 3 | 35.7 | |

Results of test with film No. B-1

| Sample | Oxygen index (%) | Thickness (μm) |
|---|---|---|
| Example 1 | 27.8 | 130 |
| Example 2 | 28.3 | 140 |
| Example 3 | 28.9 | 120 |
| Example 7 | 27.8 | 120 |
| Example 8 | 26.8 | 140 |
| Example 9 | 28.5 | 120 |
| Example 13 | 25.5 | 120 |
| Example 14 | 24.6 | 130 |
| PEEK | 23.5 | 120 |
| Polyphenylene sulfide P-4 | 28.6 | 160 |

As is apparent from the results shown above, the copolymers according to this invention showed excellent nonflammability as compared with prior aromatic polyetherketone (PEEK). Further, they showed equal or superior nonflammability to that of polyphenylene sulfide, which is known to be excellent in nonflammability.

REFERENTIAL EXAMPLE 2

Determination of crystallization rate

The copolymers obtained in Examples 1, 2, and 7 and, for comparison, an aromatic polyetherketone PEEK (mfd. by I.C.I. Ltd., brand name: Victrex 45 P) and the copolymer obtained in Comparative Example 3 were used to determine the crystallization rate.

The determination was made by using a DSC. The specimen was brought up to 400° C., then cooled down to a predetermined temperature at a rate of 320° C./min and held at the temperature. The time which elapsed from the beginning of the holding till the appearance of the peak of crystallization was measured.

The results of determination are shown below.

Peak crystallization times for material crystallized isothermally at different holding temperature (unit: second)

| Holding temp. (°C.) | Example 1 | Example 2 | Example 7 | Comparative Example 1 | PEEK 45 P |
|---|---|---|---|---|---|
| 320 | 74 | | | | |
| 310 | 25 | 92 | | | |
| 300 | 18 | 59 | 85 | 101 | 86 |
| 290 | 11 | 29 | 50 | 64 | 55 |
| 280 | | 16 | 23 | 31 | 21 |
| 270 | | | 16 | 19 | 14 |

As is apparent from the results shown above, the copolymers according to this invention showed a high crystallization rate as compared to a homopolymer comprising units (A) and units (B). Further, they showed a crystallization rate equal or superior even to that of prior aromatic polyetherketone.

As shown in Referential Examples 1 and 2 above, the copolymer of this invention is a material which has been enhanced in heat resistance (Tm, Tg, and thermal weight loss temperature) while retaining a high nonflammability inherent to polyphenylene sulfide, in other words a material which has been imparted a satisfactory nonflammability without addition of flame retardants while retaining a high heat resistance, molding stability, and mechanical strength which are inherent to aromatic polyetherketone.

EFFECT OF THE INVENTION

As is clear from the above descriptions including that in Examples, the copolymer of this invention has superior crystallization rate, and good processability for injection molding as compared to a homopolymer comprising units (A) and units (B), and a satisfactory nonflammability similarly to polyphenylene sulfide while retaining excellent heat resistance, molding stability, mechanical strength etc., as compared with prior aromatic polyetherketone. Accordingly, it can be favorably employed under severe conditions of high temperature and particularly for uses which require high nonflammability.

The polymer can be used in any desired form including molded articles, coating, film, and fiber. Further, it can be used after formed into polymer alloys or composite materials by incorporation of various engineering plastics, heat resistant resins, glass fibers, carbon fibers, inorganic substances, and other materials.

What we claim is:

1. A crystalline aromatic polyketone copolymer which has a linear polymer structure comprising structural units (A) represented by the formula (A)

structural units (B) represented by the formula (B)

and structural units (C) represented by the formula (C₁)

or the formula (C₂)

the molar ratio of said units (B) to said units (C) being in the range from 30:70 to 99:1, and the unit (A) and either the unit (B) or the unit (C) being linked alternately, and which has an intrinsic viscosity of not less than 0.40; said intrinsic viscosity is determined by measuring at 25° C. the viscosity of a solution of a concentrated sulfuric acid of a density of 1.84 g/cm³ containing 0.1 g or 0.5 g of polymer per 100 cm³ therein, wherein said crystalline aromatic polyketone copolymer is insoluble at room temperature in methylene chloride, chloroform, N,N¹-dimethylformamide, sulfolane, dimethyl sulfoxide, hexamethylphosphorictriamide, hexane or toluene.

2. The crystalline aromatic polyketone copolymer according to claim 1, wherein the unit (C) is represented by the formula (C₁)

and the intrinsic viscosity is not less than 0.40 and not more than 1.8.

3. The crystalline aromatic polyketone copolymer according to claim 1, wherein the unit (C) is represented by the formula (C₂)

and the intrinsic viscosity is not less than 0.40 and not more than 1.8.

4. The crystalline aromatic polyketone copolymer according to claim 1, wherein the molar ratio of said units (B) to said units (C) is in the range of from 40:60 to 95:5.

5. The crystalline aromatic polyketone copolymer according to claim 1, wherein the molar ratio of said units (B) to said units (C) is in the range of from 50:50 to 90:10.

* * * * *